United States Patent [19]

Tramontano et al.

[11] Patent Number: 5,283,299
[45] Date of Patent: Feb. 1, 1994

[54] AQUEOUS COATING COMPOSITIONS

[75] Inventors: Valentino J. Tramontano, Fairfield, Conn.; Milton Lapkin, Beverly Farms, Mass.; Scott D. Rothenberger, Derry, N.H.

[73] Assignee: ICI Americas, Inc., Wilmington, Del.

[21] Appl. No.: 879,275

[22] Filed: May 7, 1992

[30] Foreign Application Priority Data

May 8, 1991 [GB] United Kingdom ............... 9109860
Aug. 27, 1991 [GB] United Kingdom ............... 9118370

[51] Int. Cl.$^5$ .................................... C08F 283/00
[52] U.S. Cl. ................................. 525/529; 525/530; 525/531; 525/532; 525/533; 528/92; 528/93; 528/112
[58] Field of Search ............ 525/529, 406, 530, 531, 525/532, 533; 528/92, 93, 112

[56] References Cited

U.S. PATENT DOCUMENTS

| | | | |
|---|---|---|---|
| 2,801,228 | 7/1957 | Starck | 260/47 |
| 2,876,208 | 3/1959 | Naps | 260/43 |
| 2,928,807 | 3/1960 | Belanger | 525/530 |
| 3,355,409 | 11/1967 | Bissot et al. | 523/332 |
| 3,640,926 | 2/1972 | Slater et al. | 523/414 |
| 3,642,649 | 2/1972 | Green | 252/182 |
| 3,812,214 | 5/1974 | Markovitz | 260/830 TW |
| 3,867,354 | 2/1975 | Betts et al. | 525/530 |
| 4,131,715 | 12/1978 | Frankel | 428/413 |
| 4,196,138 | 4/1980 | Cella | 549/207 |
| 4,237,242 | 12/1980 | Frankel | 525/119 |
| 4,240,938 | 12/1980 | Kraft et al. | 525/119 |
| 4,277,383 | 7/1981 | Hayashi et al. | 525/456 |
| 4,385,097 | 5/1983 | Isozaki et al. | 524/601 |
| 4,617,331 | 10/1986 | Boberski et al. | 523/420 |
| 4,976,785 | 12/1990 | Nakano et al. | 525/453 |
| 5,026,793 | 6/1991 | Nakai et al. | 525/479 |
| 5,076,900 | 12/1991 | Van der Linde et al. | 525/526 |

FOREIGN PATENT DOCUMENTS 812873 5/1969 Canada.
2102009 1/1983 United Kingdom.

OTHER PUBLICATIONS

Abel Banov, "Worldwide Advancements in Epoxy Curing Agents", (American Paint & Coatings Journal pp. 60, 62, 64, Aug. 20, 1990).
J. D. B. Smith, "Metal Acetylacetonates as Latent Accelerators for Anhydride-Cured Epoxy Resins", (J. of Applied Polymer Science, vol. 26, 979-986, 1981).
P. V. Reddy et al., "Transition Metal Chelates as Accelerators for Epoxy Resin Systems-Studies with Cobalt III Acetylacetonate", (J. of Applied Polymer Science, vol. 41, 319-328, 1990).
Victoria J. Eddy et al., "A New One-Component Anhydride-Cured Epoxy with an Aliphatic Disiloxane Dianhydride and Metal-Coordinated Lewis Bases", (J. of Applied Polymer Science, vol. 28, 2417-2426, 1990).
Clayton A. May, "Epoxy Resins, Chemistry and Technology" (pp. 329 to 493).

Primary Examiner—Melvyn I. Marquis
Assistant Examiner—Randy Gulakowski
Attorney, Agent, or Firm—Cushman, Darby & Cushman

[57] ABSTRACT

Aqueous-based crosslinkable coating composition comprising an aqueous dispersion of at least one polymer having epoxy-reactive functional groups, at least one polyepoxide compound, and at least one metal chelate complex epoxy-cure catalyst.

21 Claims, No Drawings

AQUEOUS COATING COMPOSITIONS

The present invention relates to crosslinkable aqueous coating compositions containing certain epoxy-reactive polymers, polyepoxide compounds and certain epoxy-cure catalysts.

The provision of polymeric film coatings on a variety of substrates, usually for protective or adhesive purposes, is a well established field of technology. It is well known to improve the performance of such coatings by arranging for the components of the coating composition to be of such a nature that the applied coating becomes crosslinked (cured) during and/or after film formation from the composition. Such a composition can therefore be considered as a crosslinkable coating composition.

It is known from the prior art to provide solvent-based coating compositions which are low temperature curable on application to a substrate and which comprise polymers having epoxide-reactive functional groups, such as carboxyl or amine groups, polyepoxy compounds, and certain curing catalysts such as Group II A metal salts, amines, and quaternary ammonium compounds. For example GB Patent 2102009 discloses such compositions where the polymer is an amine-containing vinyl polymer, the polyepoxide is a conventional epoxide resin, and the catalyst is an organo-soluble Group IIA metal salt such as, in particular, magnesium nitrate or calcium nitrate. Canadian Patent 812873, as another example, discloses such compositions in which the polymer is a defined carboxyl-containing copolymer, the polyepoxide is a solvent-soluble epoxy amido copolymer, and the catalyst is a tertiary amine or quaternary ammonium compound.

It is also known from U.S. Pat. Nos. 4237242 and 4131715 to use solvent-based curable coating compositions comprising an acrylic polymer with carboxylic acid groups, a polyepoxy compound and a metal chelate catalyst such as a metal acetylacetonate. However in these disclosures it is taught that it is necessary to heat the applied coating at least 100° C. in order to effect curing of the coating.

It would be very desirable to employ crosslinkable coating compositions which on the one hand are substantially aqueous-based rather than solvent-based (in view of the environmentally undesirable nature of many organic solvents), and on the other hand will undergo effective crosslinking in the applied coating at ambient temperatures.

We have now discovered a highly effective aqueous-based crosslinkable coating composition as an alternative to solvent based systems of the type discussed above.

According to the present invention there is provided an aqueous-based crosslinkable coating composition comprising an aqueous dispersion of at least the following components:

A. at least one polymer having epoxy-reactive functional groups,
B. at least one polyepoxide compound, and
C. at least one metal chelate complex epoxy-cure catalyst.

By an "aqueous dispersion" of the components is meant a dispersion of the components in an aqueous carrier medium of which water is the principal component (usually at least 60 weight % of the carrier medium). Minor amounts of organic liquid(s) may be present if desired or required. Typically, the waterborne polymer Component A will be in the form of an aqueous latex.

The aqueous crosslinkable coating compositions of the invention are of good storage stability and provide crosslinked (cured) film coatings of excellent properties. moreover, in spite of the teaching in U.S. Pat. Nos. 4237242 and 4131715 (as discussed above), the crosslinking will often occur effectively with such aqueous-based compositions at ambient or low temperatures (e.g. up to 50° C. or 60° C., and often within the range of 15° to 25° C., which we take as the typical range for ambient temperature) although higher crosslinking temperatures could also be used if desired (no upper limit is intended). Drying (i.e. allowing or causing the aqueous-based carrier medium to become removed) before the ageing is also usually effected at ambient temperature.

Therefore it is preferred that a substrate is coated using the invention composition by applying the composition to a substrate, drying at ambient temperature and ageing the coating so formed at ambient temperature to develop crosslinking in the coating.

Turning specific attention now to the polymer having epoxy-reactive functional groups (Component A of the composition according to the invention). Examples of epoxy-reactive functional groups include carboxyl, amine (particularly primary amine) and hydroxyl groups. Combinations of different epoxy-reactive groups (e.g. carboxyl and amine; or carboxyl and hydroxyl) may exist in the same polymer molecules or in different polymer molecules (where 2 or more polymers are used for Component A). It is particularly preferred for the epoxy-reactive groups to be, at least in part (and often entirely), carboxyl groups.

The polymer of Component A may be an addition polymer derived from one or more olefinically unsaturated monomers by a free radical polymerisation process; such a polymer is hereinafter termed an "olefinic polymer" for convenience. The polymer of Component A could also be a non-free radical polyaddition polymer such as a polyurethane polymer, or a condensation polymer such as polyester.

An olefinic polymer bearing carboxyl groups (the preferred epoxy-reactive functional groups at present) is preferably a copolymer, formed using a free-radical addition process, of at least one olefinically unsaturated monomer having a carboxyl group(s) and at least one other olefinically unsaturated monomer (i.e. a monomer not having a carboxyl group(s)). Such a copolymer will have lateral carboxyl groups on the polymer chains.

Monomers which can be used to provide carboxyl groups in the copolymer are particularly alpha, beta-monolefinically unsaturated monocarboxylic acids and/or dicarboxylic acids, mostly of 3 to 5 carbon atoms, especially acrylic acid, methacrylic acid, fumaric acid and itaconic acid.

Examples of olefinically unsaturated monomers which do not provide carboxyl groups which may be mentioned include 1,3-butadiene, isoprene, styrene, divinyl benzene, acrylonitrile, methacrylonitrile, vinyl halides (such as vinyl chloride), vinyl esters (such as vinyl acetate, vinyl propionate and vinyl laurate), heterocyclic vinyl compounds, alkyl esters of monolefinically unsaturated dicarboxylic acids (such as di-n-butyl maleate and di-n-butyl fumarate) and esters of acrylic acid and methacrylic acid of formula

where $R^1$ is H or methyl and $R^2$ is an optionally substituted alkyl or cycloalkyl groups of 1 to 20 carbon atoms (more preferably 1 to 8 carbon atoms) or a siloxane group, examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate and various siloxane acrylates and siloxane methacrylates; as mentioned supra $R^2$ may also be substituted and such substituents may e.g. be or include functional groups such as hydroxyl groups, amino groups, olefinically unsaturated double bonds and halide atoms such as fluorine, and examples of such monomers include hydroxyethyl acrylate, hydroxyethyl methacrylate, (t-butylamino)ethyl methacrylate, allyl acrylate, allyl methacrylate, 1,1,1-trifluoroethyl acrylate, 1,1,1-trifluoroethyl methacrylate, hexafluoroisopropyl acrylate, and hexafluoroisopropyl methacrylate.

Generally speaking, a carboxyl-functional olefinic polymer will be derived from 0.5 to 20 mole % (more preferably 1.5 to 10 mole of carboxyl-containing monomer(s) and correspondingly 80 to 99.5 mole % (more preferably 90 to 98.5 mole %) of monomer(s) not having carboxyl groups.

An olefinic addition polymer for use as Component A may be prepared by any suitable free-radical initiated polymerisation technique, a free-radical initiator and (usually) appropriate heating being employed. The polymerisation is normally effected in an aqueous medium and in particular aqueous emulsion polymerisation is used to prepare an aqueous latex of the polymer with conventional dispersants and initiators being used. The resulting latex of the polymer could be used "as is" in the composition (apart from optional dilution or concentration or the addition of coalescing solvent to assist in film formation).

Also typical is the preparation of a carboxylic acid—containing polymer in a solvent which is then dispersed in water in the presence of a base such as ammonia or an amine to produce an aqueous dispersion (water-reducible system).

Other systems can also be derived from solid (dry) polymers containing carboxylic acid groups which are dispersed (dissolved) in water containing a base.

As mentioned supra, polymers other than olefinic addition polymers could also be used as Component A. For example a polyurethane polymer bearing carboxyl groups (e.g. laterally disposed) could be employed. As is well known polyurethane polymers (or analogous polymers such as polyureas), are generally made by reacting an organic polyisocyanate with an organic compound containing at least two isocyanate-reactive groups, particularly a macropolyol with the optional inclusion of a low molecular weight polyol. A favoured route to their formation involves the formation of an isocyanate-terminated prepolymer followed by chain extension with an active hydrogen containing compound. A polyurethane bearing carboxyl groups could e.g. be made by employing as a reactant, in the polyurethane prepolymer formation step, an isocyanate-reactive compound having at least one carboxyl group and at least two isocyanate reactive groups (such as 2,2-dimethylolpropionic acid), together with other compound(s) bearing isocyanate-reactive groups (usually polyol(s)), thereby to form a prepolymer bearing lateral carboxyl groups, followed by chain-extension with an active hydrogen containing compound (e.g. hydrazine or a diamino compound). Some of the carboxyl groups of the polyurethane could be neutralised with an appropriate base to render it more readily water-dispersible, or the polyurethane could incorporate lateral nonionic groups (such as polyoxyethylene chain groups) to render it more water-dispersible (or a combination of both expedients could be used). The incorporation of such dispersing groups into a polyurethane is well known in the art and need not be discussed here in detail.

The level of the epoxide-reactive functional groups in the polymer of Component A should obviously be tailored to suit the particular nature of the polymer itself, the particular nature of the other components B and C, and the intended application of the coating composition. Generally speaking, however, the epoxy-reactive group content in the polymer will usually be within the range of from 10 to 400 millimoles (more preferably 20 to 200 millimoles) of epoxy-reactive groups per 100g of polymer.

The polyepoxide compound (Component B) is a compound having an average of two or more epoxide groups per molecule. It should of course be of a type which can be dispersed in water (containing surfactant and/or cosolvent if required) in order to fulfil the requirements of the invention. It may be monomeric, oligomeric or polymeric in nature.

The polyepoxide compound used in the invention is, in particular, a "polyepoxide resin" (or more simply an "epoxy resin"), examples of such materials being very well known in the industry (usually meriting a comprehensive chapter in most chemistry encyclopaedia) and being widely available commercially. They may range from low to high molecular weight materials. Examples of the different types of such polyepoxide resins which may be used include cycloaliphatic epoxide resins (e.g. "Cyracurell UVR-6110, "Cyracure" UVR-6200 and "Cyracurell ERL-4299; manufacturer Union Carbide Corporation); linear aliphatic polyepoxide resins (e.g. "Heloxyl" 5048 and "Heloxy" 5044; manufacturer Hi-Tek Polymers); water-dispersible bisphenol-A based epoxy resins (e.g. WD-510; manufacturer Hi-Tek Polymers); and low molecular weight epoxides such as triglycidyl isocyanurate TGIC (e.g. "Araldite" PT 810; manufacturer Ciba-Geigy).

The polyepoxide compound can also be a polymeric material bearing epoxide groups (other than an epoxy resin of the high molecular weight type), for example an olefinic addition (co)polymer (i.e. an addition polymer derived from one or more olefinically unsaturated monomers by a free radical polymerisation process, as defined above) bearing epoxide groups. Examples of such polymers include e.g. homo and copolymers of glycidyl acrylate or methacrylate, and homo and copolymers of 3,4-epoxycyclohexylmethylacrylate or methacrylate.

Metal chelate complexes are well known in the art. They may be of nonionic or ionic character. Often the metal in the chelate complex is one having an ionic valence of 1 to 4 (and a coordination number of 2 to 8). An important structural characteristic of metal chelate complexes is the presence therein of a ring structure in which the metal atom is a ring member. The chelate therefore has at least one (often two or more) rings and the non-metallic portion of the ring(s) is normally of organic character. The chelating agents (ligands), i.e. the compounds which makes possible the formation of metal chelates from metal or metal ions, contain 2 or more functional groups (which may be the same or different) usually having N, O, P and/or S as electron donating atoms.

By a metal chelate epoxy-cure catalyst (Component C) is meant a metal chelate complex which will accelerate the curing arising from the reaction between the epoxy-reactive groups and the epoxy groups. We are not certain of the role of the metal chelate in accelerating the curing, and it may possibly be that to at least some degree the metal of the chelate becomes incorporated into the crosslinked structure as well as acting simply as an catalyst. However, we do not wish to be bound by any theories on this question.

The metal chelate epoxy-cure catalysts of component C will often (and preferably) be readily water-soluble materials.

The metal chelate of component C is usefully the chelate complex of a metal and a ligand-providing organic compound comprising at least two electron-donating atoms in a 1,5 electron donatable spatial arrangement. By a 1,5 electron donatable spacial arrangement is meant an arrangement in which the electron donating atoms (usually hetero atoms selected from O, N, P and S), which may be the same or different, form the first and fifth members of a chain of 5 atoms, i.e. there being 3 intermediate atoms (which may be the same or different but are usually all carbon atoms). This may be represented schematically as

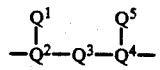

where $Q^1$ and $Q^5$, which may be the same or different, are the electron donating atoms of the chain and $Q^2$, $Q^3$ and $Q^4$, which may be the same or different, are the intermediate atoms of the chain.

Such a material is usefully the chelate complex of a metal and a 1,3-dicarbonyl ligand-providing organic compound. By a 1,3-dicarbonyl-ligand providing organic compound is meant a compound having at least two carbonyl groups arranged in a 1,3 spatial arrangement with reference to the carbon atoms to which they are bonded (i.e. the 1,3 numbers refer here to the carbon atoms), i.e. schematically,

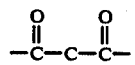

and able to take part in chelation with a metal. It is therefore seen that such ligands are examples of ligands in which the electron donating atoms (both carbonyl O) are in a 1,5 electron donatable spacial arrangement, with the 3 intermediate atoms of the chain being carbon.

Examples of metal chelates of 1,3-dicarbonyl ligand-providing organic compounds are metal beta keto esters, examples of which include metal acetoacetate esters such as metal ethyl acetoacetates (ligand: ethyl acetoacetate), and metal malonate esters such as metal diethyl malonates (ligand: diethyl malonate). Other examples of metal chelates of 1,3-dicarbonyl ligand-providing organic compounds include metal acetylacetonates (ligand: acetylacetone), metal formylacetonates (ligand: formylacetone) and metal formylacetophenonates (ligand: formylacetophenone). Particularly preferred metal chelate complexes of this type are metal acetylacetonates and metal acetoacetate esters.

Further examples of metal chelates of a metal and a ligand-providing organic compound comprising at least 2 electron-donating atoms in a 1,5 electron donatable spacial arrangement are those in which the electron donating pair of atoms of the ligand compound are: the oxygen of a hydroxyl group (or its anion) and the carbonyl oxygen of a carboxyl group (or its anion), or the nitrogen atom of an amine group and the carbonyl oxygen of a carboxyl group; or the oxygen atom of a hydroxyl group (or its anion) and the non-carbonyl oxygen of a carboxyl group (or its anion); or the nitrogen atoms of two amino groups; or the sulphur atom of a thioether group and the nitrogen atom of an amine group. Examples of such ligands include certain amino acids, salicylates, proteins, and cyclodextrines.

The metal chelate complex could also be the chelate complex of a metal and a ligand-providing organic compound comprising at least two electron-donating atoms in a 1,4 electron-donating spacial arrangement. By a 1,4 electron donatable special arrangement is meant (analogously with a 1,5 arrangement as discussed supra) an arrangement in which the electron donating atoms (usually hetero atoms selected from O, N, P and S), which may be the same or different, form the first and fourth members of a chain of 4 atoms, i.e. there being 2 intermediate atoms (which may be the same or different but are usually all carbon atoms). This may be represented schematically as

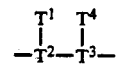

where $T^1$ and $T^4$, which may be the same or different, are the electron donating atoms of the chain and $T^2$ and $T^3$, which may be the same or different, are the intermediate atoms of the chain.

Examples of such ligands with a 1,4 spacial arrangement of electron donating atoms include certain proteins and amino acids, but more preferably hydroxyalkylamines such as in particular:

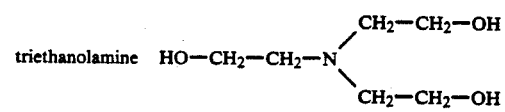

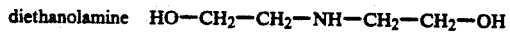

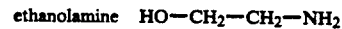

Preferred metals for the chelate complexes include Al, Ti, Fe, Co, Ba, Zr, K and Zn, and Al and Ti are particularly preferred. Other metals which could be used include Be, Cd, Ga, Na, V and Zn. Chelate complexes of rare earth metals such as Sc, Y and La could also be expected to be useful. (NB Al, Ti etc. refer to the conventionally used symbols for these metals, thus Al is aluminium, Ti is titanium, and so on).

The metal chelate complex of Component C is in one preferred embodiment of the invention (as mentioned above) a metal acetylacetonate chelate complex, which may be unsubstituted in the acetylacetone ligand or substituted in the ligand with groups such as halogen, alkyl, aryl or alkaryl. This type of chelate complex may be thought of in terms of the following general formula:

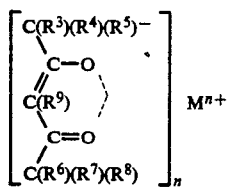

where M is a metal ion and n is an integer, usually 1 to 4, corresponding to the ionic valence number of the metal atom and $R^3$, $R^4$ and $R^5$ (which may all be the same or may all be different or two may be the same and the other different) are groups selected from H and substituent groups, and $R^6$, $R^7$, and $R^8$ (which may all be the same or may all be different or two may be the same and the other different) are groups selected from H and substituent groups, and $R^9$ is a group selected from H and a substituent group. [$R^3$, $R^4$, and $R^5$ could of course all be the same as, or could all be different to, or one or two could be the same as and the other(s) different to, the groups $R^6$, $R^7$ and $R^8$ respectively; also $R^9$ could be the same as one of the groups $R^3$, $R^4$, $R^5$, $R^6$, $R^7$ and $R^8$ or it could be different to all of them.] As mentioned supra, suitable substituent groups include halogen, alkyl, aryl and alkaryl groups (the alkyl or alkaryl groups often being of 1 to 20 carbon atoms). In the simplest (and most usual) case of course, $R^3$ to $R^9$ are all H, giving the unsubstituted acetylacetone ligand.

A particularly preferred metal acetylacetone is Al-(III) (acetylacetonate)$_3$ which is known to be highly effective. Also preferred are the acetylacetonates of Ti, Fe, Co, Ba, Zr, K and Zn which are also very effective. The acetylacetonates of other metals, such as those other metals mentioned supra, will also be useful.

Apart from Al (III) (acetylacetonate)$_3$, other specific examples of metal acetylacetonate complexes are La (III) (acetylacetonate)$_3$, Cu (II) (acetylacetonate)$_2$, Fe (III) (acetylacetonate)$_3$, Co (II) (acetylacetonate)$_2$, Zr (IV) (acetylacetonate)$_4$, K (I) acetylacetonate, Ba (II) (acetylacetonate)$_2$, Cr (III) (acetylacetonate)$_3$, Zn (II) (acetylacetonate)$_2$, Ti (II) (acetylacetonate)$_2$, and Co (II) (benzylacetylacetonate)$_2$.

The metal chelate complex of Component C is in another preferred embodiment of the invention is a metal hydroxylalkylamine chelate complex such as a metal ethanolamine chelate complex, a metal diethanolamine chelate complex, or a metal triethanolamine chelate complex. A particularly preferred metal chelate complex of this type is Ti bis (triethanolamine). Also preferred are the corresponding chelate complexes of Fe, Al, Co, Ba, Zr and Zn.

In some cases, the metal chelate complex of component C is in the form of a compound in which the metal is covalently bonded to one or more organic groups as well as being coordinated to one or more donor ligands. A preferred example of such a material is a half chelate/alkoxide in which the metal is covalently bonded to one or more alkoxide groups (e.g. of 1 to 4 carbon atoms, such as isopropoxide or t-butoxide) as well as being bonded to one or more donor ligand compounds. In particular, the donor ligand is a 1,3-dicarbonyl compound such as acetylacetone, or a hydroxylalkylamine such as ethanolamine, diethanolamine, or triethanolamine. Particularly preferred examples of such half chelate/alkoxide compounds are bis(triethanolamine) Ti di-isopropoxide and bis(acetylacetonate) Ti-di-isopropoxide. The metal of such half chelate/alkoxide compounds can also usefully be Fe, Al, Co, Ba, Zr and Zn.

Mixtures of different metal chelate epoxy-cure catalysts may of course be used for component C.

The amounts of Components A, B and C in the composition may vary between wide limits and will be selected with the particular nature of the components and the intended application(s) in mind. Generally speaking, the levels of A, B and C will usually be within the following ranges (based on the total weight, on a dry basis, of A, B and C in the composition):

A : 70 to 99.8 wt. % (more preferably 90 to 99 wt. %)
B : 0.1 to 20 wt. % (more preferably 0.5 to 7 wt. %)
C : 0.1 to 15 wt. % (more preferably 0.5 to 3 wt. %)

In another embodiment of the invention, the composition contains a free (uncomplexed) amount of a ligand-providing organic compound(s), this being of the type which forms a metal chelate epoxy-cure catalyst with a metal. The ligand compound can be the same as or different to the ligand-providing compound(s) which is already complexed to the metal in the metal chelate of the composition but of course is a free (i.e. uncomplexed) material and not bound to the metal. It is found that the presence of free ligand-providing compound in the composition may provide a further useful degree of stability to the composition. A ligand-providing compound can be arranged to be present in free form in the composition, for example, by using a stoichiometric excess of the complexing ligand when preparing the metal chelate for use in the composition, or, as when using a preformed metal chelate, by adding a ligand-providing compound(s) directly to the composition (and, as mentioned supra, this can be the same as or different to the complexed ligand). It is preferred, in this embodiment, that there is a level of free ligand compound in the composition corresponding to 10 to 600 % w/w (more preferably 100 to 300 % w/w) based on the weight of the metal chelate epoxy-cure catalyst (Component C) present in the composition. Examples of free ligand compounds include acetylacetone, ethylacetoacetate (as the compound per se or in anionic salt form, e.g. as the Na salt Na ethylacetoacetate) and t-butylacetyl acetone.

The Components A, B and C may be brought together in any appropriate manner or order using any suitable technique. For example, the polyepoxide of Component B may be added (with stirring) to an aqueous dispersion of the polymer of Component A, followed by the addition (with stirring) of the metal chelate complex of Component C (optionally dissolved in a suitable solvent if this is desirable and necessary) or vice versa. (The complex may be added preformed, or in some cases the components therefor may be added individually so that chelate formation takes place in-situ). As mentioned supra, it is possible in one embodiment for a level of a free chelating ligand compound to be present in the composition; this could e.g. be incorporated along with Component C (or with one or more of the other components) or could be added individually at any stage of the formulation of the composition, e.g. it could be added after A, B, C have been formulated together. The entire composition formulation could then (if necessary) be stirred for a suitable period of time. Another way of forming the composition could be to have all components dissolved in an organic solvent, and then to dilute with water to achieve the aqueous-based composition.

The compositions of the invention usually have a solids content within the range of from 10 to 70 wt. % (30 to 50 wt. % being fairly typical).

We believe the use of the Components B and C as an activator system for crosslinking the waterborne polymer of Component A is novel and inventive in its own right.

Accordingly there is further provided according to the invention the use of a combination of at least one polyepoxide compound B and a metal chelate complex epoxy-cure catalyst C as an activator system for crosslinking at least one waterborne polymer having epoxy reactive functional groups A during and/or after coating film formation from a coating composition comprising these three components.

Additionally, since the compositions of the invention are storage stable (i.e. they will not undergo unacceptable premature cross linking prior to coating onto a substrate), such stability optionally being emphasised by the optional presence of excess chelate-forming ligand in the composition as discussed supra, they may be supplied to customers as a "one-pack system" containing all three essential Components A, B and C, and it is not necessary for the customers to combine all the components shortly before coating usage (as in two-pack systems) in order to avoid premature crosslinking.

Accordingly there is further provided according to the invention a storage stable one-pack aqueous crosslinkable coating composition comprising Components A, B and C as defined supra, and optionally including a free quantity of a chelate-forming ligand compound of the type which forms a metal chelate epoxy-cure catalyst with a metal.

The aqueous coating compositions of the invention yield coatings of excellent properties, and in particular excellent solvent resistance. For this purpose they may be used "as is" or further diluted with water and/or organic solvents, or they may be supplied in more concentrated form by evaporation of water and/or organic components of the liquid medium. As coating compositions, they may be applied to a variety of substrates including wood, metals, glass, cloth, leather, concrete, paper, plastics, foam and the like, by any conventional method including brushing, dipping, flow coating, spraying, and the like. The liquid carrier phase is removed (drying) usually at ambient temperature, to form a film coating. If appropriate the resulting film coating can be heated at moderately elevated temperatures to properly develop the cross linking although very often merely ageing the coating at ambient temperatures will be sufficient to develop excellent crosslinking. The compositions may contain other conventional ingredients including organic coalescing solvents, pigments, dyes, emulsifiers, surfactants, thickeners, heat stabilisers, levelling agents, wetting agents, anti-cratering agents, fillers, sedimentation inhibitors, fire retardants, UV absorbers, antioxidants and the like introduced at any stage of making the composition or subsequently.

The present invention is now illustrated by the following examples. Unless otherwise specified, all parts and percentages are on a weight basis.

In these examples, the double rub test assesses the solvent resistance of a film drawn on a substrate which has been derived from a composition by ageing the film coating for a period of time at room temperature (i.e. ambient temperature) after room temperature drying, and is effected by rubbing the film with a rag soaked with the solvent (e.g. MEK) until the film fails (i.e. is showing through to the substrate) or until 200 double rubs is achieved without failure, when the film is rated as >200.

In these examples, the spot test also assesses the solvent resistance of a film coating and is determined by drawing wet film onto a substrate and drying to a film at room temperature (i.e. ambient temperature). After ageing for a period of time (usually at room temperature) the film is spotted with the solvent in question by saturating a 2.3cm (diameter) filter paper circle and covering it with a watch glass for 10 minutes. After 10 minutes time, the filter paper is removed and the spotted area is rated for its solvent resistance where 0=worst and 10=best. In these spot tests, six solvents are used for a given sample, and the results averaged to obtain an average. The following abbreviations and notations are used in the examples.

acac : acetylacetonate (unsubstituted)
bacac : benzylacetylacetonate
A-622 : "Neocryl" A622 carboxyl-functional acrylic polymer aqueous latex (polymer solids 32%), which contains a coalescing solvent system (ICI Resins US)
A-639 : "Neocryl" A-639 carboxyl-functional acrylic polymer aqueous latex (polymer solids 45%), which does not contain a coalescing solvent system (ICI Resins US)
A-601 : "Neocryl" A-601 carbonyl-functional acrylic polymer aqueous latex (polymer solids 32%), which contains a coalescing solvent (ICI Resins US)
R-960 and R-962 "Neorez" R-960 and "Neorez" R-962 carboxyl-functional polyurethane aqueous dispersions, which both contain a coalescing solvent (ICI Resins US)
UVR-6110 : cycloaliphatic polyepoxide "Cyracure" UVR-6110
ERL-4299 : cycloaliphatic polyepoxide "Cyracure" ERL-4299 (all Union Carbide)
Hxy 5048 and Hxy 5044 : linear aliphatic polyepoxides "Heloxy" 5048 and 5044 (Hi-Tek Polymers)
WD-510 : a water dispersed bisphenol A based polyepoxide (Hi-Tek Polymers)
RT : room temperature (about 20° C. in the examples)
C : control run
MEK : methyl ethyl ketone
EtOH : ethanol
MeOH : methanol
IPA : isopropanol
Tol : toluene
NCF : non-coalesced film All compositions were made by adding the epoxy compound to the aqueous dispersion of the carboxyl-functional polymer (with stirring) followed by the addition of the metal catalyst (dissolved in a suitable solvent in some cases) or vice versa. All references to the levels of polymers, epoxides and metal chelates refer to the solid materials (not solutions or dispersions) unless otherwise specified.

The words Neocryl, Neorez, Cyracure, Heloxy, Tyzor, and Tilcom are registered trade marks.

EXAMPLES 1 to 5

Compositions having the formulations shown in Table 1 were prepared and tested for solvent resistance using the double rub test (MEK solvent), the coating films being drawn on a glass substrate (3 mil wet; about 1 mil dry; 1 mil=$10^{-3}$ 3 inch). Comparative control compositions (without epoxide and metal catalyst) were also assessed. All compositions contained approximately 16g of the carboxyl polymer (weight of solid polymer, not latex). The metal acetylacetonate chelate complexes used in these and following examples were the preformed commercially available materials. The results are shown in Table 1.

TABLE 1

| Ex No. | Polymer disp. | Catalyst | Cat level g. | Epoxy | Epoxy level g. | No. days aged at RT | MEK double rubs |
| --- | --- | --- | --- | --- | --- | --- | --- |
| 1 | A-622 | Al(acac)$_3$ | 0.12 | UVR-6110 | 2.0 | 10 | 110 |
| 2 | A-622 | Al(acac)$_3$ | 0.24 | UVR-6110 | 2.0 | 10 | >200 |
| 3 | A-622 | Al(acac)$_3$ | 0.24 | UVR-6110 | 2.0 | 13 | >200 |
| 4 | A-622 | Al(acac)$_3$ | 0.36 | UVR-6110 | 2.0 | 13 | >200 |
| 5 | A-622 | Co(acac)$_3$ | 0.12 | UVR-6110 | 2.0 | 13 | >200 |
| C | A-622 | — | — | — | — | 7-13 | 20 |
| C | A-622 | — | — | UVR-6110 | 2.0 | 7-13 | 20 |

The results in Table 1 indicate that extensive cross linking is occurring in the coating film samples derived from the invention compositions, as shown by their increased double rub resistance.

EXAMPLES 6–20

Compositions having the formulations shown in Table 2 were prepared and tested for solvent resistance using the solvent spot test, the film coatings being drawn on B-1000 (cold-rolled steel) test panels (5 mil wet; about 2 mil dry; 1 mil = $10^{-3}$ inch). Composition control runs (without metal catalyst) were also assessed. All compositions contained approximately 16g of the carboxyl polymer (weight of solid polymer, not latex). The results are shown in Table 3. (It may be mentioned that the compositions of Table 2 are representative samples of a very much larger series of runs). The improved performance of the invention compositions is readily apparent.

TABLE 2

| Ex No. | Polymer disp. | Catalyst | Cat level (g) | Epoxy | Epoxy level (g) |
| --- | --- | --- | --- | --- | --- |
| 6 | R 962 | Al(acac)$_3$ | 0.24 | Hxy 5048 | 2 |
| 7 | R 962 | Al(acac)$_3$ | 0.24 | WD 510 | 2 |
| 8 | R 962 | Al(acac)$_3$ | 0.24 | WD 510 | 1 |
| 9 | R 960 | Al(acac)$_3$ | 0.5 | ERL 4299 | 0.5 |
| 10 | R 960 | Al(acac)$_3$ | 0.24 | Hxy 5048 | 1 |
| 11 | R 960 | Al(acac)$_3$ | 0.24 | ERL 4299 | 1 |
| 12 | R 960 | Al(acac)$_3$ | 0.24 | WD 510 | 2 |
| 13 | R 960 | Al(acac)$_3$ | 0.24 | WD 510 | 1 |
| 14 | A 622 | Al(acac)$_3$ | 0.36 | UVR 6110 | 1.5 |
| 15 | A 622 | Al(acac)$_3$ | 0.36 | UVR 6110 | 1 |
| 16 | A 622 | Al(acac)$_4$ | 0.24 | Hxy 5048 | 1 |
| 17 | A 622 | Zr(acac)$_4$ | 0.36 | UVR 6110 | 1 |
| 18 | A 622 | Al(acac)$_3$ | 0.24 | WD 510 | 2 |
| 19 | A 622 | K(acac)$_4$ | 0.24 | UVR 6110 | 1 |
| 20 | A 622 | Co(bacac)$_2$ | 0.24 | UVR 6110 | 1.5 |
| C | R 960 | — | — | UVR 6110 | 1 |
| C | R 960 | — | — | ERL 4299 | 1 |
| C | R 960 | — | — | Hxy 5048 | 1 |
| C | R 960 | — | — | WD 510 | 1 |
| C | A 622 | — | — | UVR 6110 | 1 |
| C | A 622 | — | — | Hxy 5048 | 1 |
| C | A 622 | — | — | WD 510 | 1 |

TABLE 3

| Ex No. | No. days aged at RT | Tol | EtOH/ water | EtOH | MeOH | IPA | MEK | Av. |
| --- | --- | --- | --- | --- | --- | --- | --- | --- |
| 6 | 11 | 9.5 | 9.5 | 7 | 8 | 9.5 | 9 | 8.8 |
| 7 | 8 | 9 | 9 | 7 | 7 | 10 | 6.5 | 8.1 |
| 8 | 8 | 9 | 9 | 7 | 7 | 9 | 7 | 8.0 |
| 9 | 10 | 10 | 10 | 6.5 | 8 | 10 | 9 | 8.9 |
| 10 | 12 | 10 | 9.5 | 7.5 | 8 | 9.5 | 9 | 8.9 |
| 11 | 10 | 10 | 10 | 7 | 7 | 9.5 | 9 | 8.8 |
| 12 | 8 | 9 | 10 | 7 | 8 | 9 | 9 | 8.7 |
| 13 | 8 | 9.5 | 9 | 7 | 7 | 9 | 9 | 8.4 |
| 14 | 7 | 9.5 | 10 | 8 | 7 | 9 | 9 | 8.8 |
| 15 | 7 | 10 | 10 | 7 | 7 | 9 | 9 | 8.7 |
| 16 | 12 | 8 | 10 | 7 | 7 | 9 | 7 | 8.0 |
| 17 | 10 | 5.5 | 10 | 7 | 7 | 8 | 7 | 7.4 |
| 18 | 7 | 6 | 9 | 6 | 6 | 9 | 6 | 7.0 |
| 19 | 10 | 6 | 10 | 5 | 5 | 7 | 7 | 6.7 |
| 20 | 8 | 7 | 9 | 1 | 7 | 7 | 6.5 | 6.3 |
| C | 12 | 9 | 8 | 0 | 0 | 8 | 8.5 | 5.6 |
| C | 12 | 9 | 7 | 0 | 0 | 7.5 | 9 | 5.8 |
| C | 12 | 9 | 8 | 1 | 0 | 8 | 9 | 5.8 |
| C | 12 | 9 | 7 | 0 | 0 | 8 | 9 | 5.5 |
| C | 12 | 3 | 7 | 4 | 4 | 6 | 3 | 4.5 |
| C | 12 | 2 | 7 | 4 | 4 | 6 | 3 | 4.3 |
| C | 12 | 2 | 7 | 1 | 1 | 6 | 2 | 3.2 |

EXAMPLES 21 TO 43

In these examples the effect of added ligand (present as free material) on composition stability was examined.

In all these examples the polymer dispersion A-622 was used to provide about 16g of solid polymer, the epoxy compound employed was UVR 6110, and the chelate catalyst used was Al(acac)$_3$. The effect on solvent-resistance of the aqueous compositions of first ageing them at 52° C. in an oven for various periods of time (0, 1, 2, 3, 4 weeks) before subsequent coating film formation and ageing of the air-dried film coatings at room temperature (various times) and testing for spot solvent resistance (as described supra in Examples 6 to 20), was examined in order to assess the stabilising effect of two added ligand compounds on the compositions.

The formulations of the compositions used, and of the oven ageing regimes are shown in Table 4. (All compositions contained 16g of the carboxyl polymer as mentioned above). The added ligand compounds used were acetylacetone (abbreviation: A) and ethylacetoacetate (abbreviation: E). The results are shown in Table 5. (It may be mentioned that the compositions of Table 4 are representative of a much larger series of runs). The further improved stability of the compositions containing added ligand is readily apparent.

TABLE 4

| Ex No. | Cat level (g) | Epoxy level (g) | Added ligand | Amount added ligand (g) | Oven age time (weeks) |
| --- | --- | --- | --- | --- | --- |
| 21 | 0.24 | 1 | none | — | 0 |

TABLE 4-continued

| Ex No. | Cat level (g) | Epoxy level (g) | Added ligand | Amount added ligand (g) | Oven age time (weeks) |
|---|---|---|---|---|---|
| 22 | 0.12 | 1 | none | — | 1 |
| 23 | 0.12 | 1 | none | — | 2 |
| 24 | 0.24 | 1 | none | — | 3 |
| 25 | 0.24 | 1 | A | 0.12 | 0 |
| 26 | 0.24 | 1 | A | 0.12 | 1 |
| 27 | 0.24 | 1 | A | 0.12 | 3 |
| 28 | 0.24 | 1 | A | 0.12 | 4 |
| 29 | 0.24 | 1 | A | 0.24 | 0 |
| 30 | 0.24 | 1 | A | 0.24 | 1 |
| 31 | 0.24 | 1 | A | 0.24 | 4 |
| 32 | 0.24 | 1 | A | 0.36 | 3 |
| 33 | 0.24 | 1 | A | 0.48 | 1 |
| 34 | 0.24 | 1 | A | 0.48 | 3 |
| 35 | 0.24 | 1 | E | 0.12 | 1 |
| 36 | 0.24 | 1 | E | 0.12 | 3 |
| 37 | 0.24 | 1 | E | 0.12 | 4 |
| 38 | 0.24 | 1 | E | 0.24 | 3 |
| 39 | 0.24 | 1 | E | 0.24 | 4 |
| 40 | 0.24 | 1 | E | 0.36 | 1 |
| 41 | 0.24 | 1 | E | 0.36 | 3 |
| 42 | 0.24 | 1 | E | 0.36 | 4 |
| 43 | 0.24 | 1 | E | 0.48 | 4 |

EXAMPLES 44 TO 54

Compositions having the formulations shown in Table 6 were prepared and tested for solvent resistance using the double rub test (MEK solvent). In Examples 47 to 50 isopropanol was also added to solubilize the catalyst (0.75 g in Examples 47, 48 and 50, 1.5 g in Example 49). All the compositions contained 16 g of the carboxyl polymer (weight of solid polymer not latex) except for Example 53 which contained 32 g of the polymer. The catalyst levels refer to the materials as obtained from the suppliers (i.e. including solvent if used). The stirred compositions were equilibriated for a short period of time, and coatings drawn down onto B-1000 (cold-rolled steel) test panels (3 mil wet; 1.2–1.3 mil dry; 1 mil = $10^{-3}$ inch). A comparative control composition (no epoxide or metal catalyst) was also assessed.

The results are shown in Table 6 and indicated that extensive crosslinking is occurring in the coatings derived from the invention compositions, as shown by their increased double rub resistance.

TABLE 5

| Ex No. | No. days film (dry) aged at RT | SPOT TEST RATINGS | | | | | |
|---|---|---|---|---|---|---|---|
| | | Tol | EtOH/ water | EtOH | MeOH | IPA | MEK | Av. |
| 21 | 8 | 6 | 9 | 6 | 7 | 9 | 6 | 7.2 |
| 22 | 7 | 4 | 9 | 5 | 5.5 | 8 | 4 | 5.8 |
| 23 | 7 | 4 | 7 | 5.5 | 5 | 6.5 | 5 | 5.5 |
| 24 | 7 | NCF | NCF | NCF | NCF | NCF | NCF | NCF |
| 25 | 7 | 7 | 10 | 7 | 7 | 9 | 7 | 7.8 |
| 26 | 16 | 6.5 | 10 | 7 | 7.5 | 8 | 7 | 7.7 |
| 27 | 7 | 6 | 9 | 6.5 | 6.5 | 7 | 6 | 6.8 |
| 28 | 7 | 3 | 8 | 5 | 5 | 6 | 4 | 5.2 |
| 29 | 7 | 7 | 10 | 7 | 7 | 8 | 7 | 7.7 |
| 30 | 16 | 6 | 9 | 7 | 8 | 8 | 6 | 7.3 |
| 31 | 7 | 2 | 6 | 3 | 3 | 6 | 2 | 3.7 |
| 32 | 7 | 7 | 10 | 7 | 7 | 8 | 7 | 7.7 |
| 33 | 16 | 6 | 10 | 6.5 | 6.5 | 7 | 6 | 7.0 |
| 34 | 7 | 7 | 10 | 7 | 7 | 8 | 7 | 7.7 |
| 35 | 11 | 5.5 | 9 | 5.5 | 5 | 7 | 5 | 6.2 |
| 36 | 12 | 5 | 8.5 | 5 | 5 | 8 | 5 | 6.1 |
| 37 | 7 | 4 | 8 | 4 | 4.5 | 7 | 4 | 5.3 |
| 38 | 12 | 4 | 8 | 4 | 5 | 8 | 5 | 5.7 |
| 39 | 7 | 4.5 | 8 | 4 | 5 | 9 | 5 | 5.9 |
| 40 | 7 | 5.5 | 9 | 5 | 5.5 | 7.5 | 7 | 6.6 |
| 41 | 12 | 4 | 9 | 5 | 5.5 | 9 | 5 | 6.3 |
| 42 | 7 | 5.5 | 9 | 4.5 | 5 | 8 | 5 | 6.2 |
| 43 | 7 | 4 | 9 | 4.5 | 5 | 9 | 4 | 5.9 |

TABLE 6

| Ex. No. | Polymer disp. | Catalyst | Cat. level (g) | Epoxy | Epoxy level (g) | No. days aged at RT | MEK double rubs |
|---|---|---|---|---|---|---|---|
| 44 | A-601 | TEAL[1] | 0.5 | Hxy5048 | 1.0 | 7 | 63 |
| 45 | A-601 | TEAL[1] | 1.0 | Hxy5048 | 1.0 | 7 | 136 |
| 46 | A-601 | TEAL[1] | 2.0 | Hxy5048 | 1.0 | 7 | 166 |
| 47 | A-601 | CLA[2] | 1.5 | Hxy5048 | 0.5 | 7 | 200 |
| 48 | A-601 | CLA[2] | 2.25 | UVR-611 | 0.5 | 7 | 163 |
| 49 | A-601 | GFI[3] | 1.5 | Hxy5048 | 0.5 | 7 | 200 |
| 50 | A-601 | GFI[3] | 2.25 | UVR-611 | 0.6 | 7 | 200 |
| 51 | A-601 | ATC-30[4] | 1.5 | Hxy5048 | 0.5 | 7 | 200 |
| 52 | A-601 | ATC-30[4] | 1.5 | UVR-6110 | 0.5 | 7 | 113 |
| C | A-601 | — | — | — | — | 7 | 30 |
| 53 | A-601 | Al(acac)$_3$[5] | 1.2 | Hxy5048 | 1.0 | 7 | 198 |

TABLE 6-continued

| Ex. No. | Polymer disp. | Catalyst | Cat. level (g) | Epoxy | Epoxy level (g) | No. days aged at RT | MEK double rubs |
|---------|---------------|----------|----------------|-------|-----------------|---------------------|-----------------|
| 54 | A-601 | ATC-OL[6] | 0.9 | Hxy5048 | 0.5 | 7 | 182 |

[1] proprietary aluminium chelate of Al and triethanolamine (supplied by Chattem Chemicals, having 2% Al content in a proprietary solvent).
[2] "Tyzor" CLA, a proprietary Ti chelate (77% solids in isopropanol, supplied by DuPont).
[3] "Tilcom" GF1, a mixture of bis (triethanolamine) Ti di-isopropoxide and (acac)$_2$ Ti di-isopropoxide (77% solids in isopropanol, supplied by Tioxide Chemicals).
[4] Al tris (ethyl acetoacetate) (33% solids in xylenes, supplied by Chattem Chemicals).
[5] the 1.2 g of metal chelate were dissolved in 6.8 g warm methanol prior to addition to the polymer latex.
[6] proprietary Al chelate of ethylacetoacetate and an aliphatic oxide (100% solids, supplied by Chattem Chemicals).

EXAMPLES 55, 56

Compositions having the formulations shown in Table 7 were prepared and tested for solvent resistance using the double rub test (MEK solvent). All the compositions contained 36.3 g of the carboxyl polymer (weight of solid polymer, not latex) and the catalyst level of ATC-30 refers to the material as obtained from the supplier (i.e. including the solvent). The coatings were drawn down onto B-1000 (cold-rolled steel) test panels (3 mil wet, 1.2–1.3 mil dry; 1 mil = 10$^{-3}$ inch). A comparative control composition (no epoxy or metal catalyst) was also assessed.

The advantageous results achieved with the invention compositions is clearly apparent.

TABLE 7

| Ex. No. | Polymer disp. | Catalyst | Cat. level (g) | Epoxy | Epoxy level (g) | No. days aged at RT | MEK double rubs |
|---------|---------------|----------|----------------|-------|-----------------|---------------------|-----------------|
| 55 | A-639[1] | Al(AcAc)$_3$[2] | 0.72 | Hxy5048 | 1.4 | 7 | >200 |
| 56 | A-639[1] | ATC-30 | 4.8 | Hxy5048 | 1.4 | 7 | >200 |
| C | A-639[1] | — | — | — | — | 7 | 29 |

[1] Polymer latex treated with coalescing solvent (19.4 g solvent to 80.6 g aqueous latex).
[2] the 0.72 g of metal chelate were dissolved in 2.0 g methanol prior to addition to the polymer dispersion.

We claim:

1. Aqueous-based crosslinkable coating composition comprising an aqueous dispersion of at least the following components:
   A. at least one polymer having epoxy-reactive functional groups,
   B. at least one polyepoxide compound, and
   C. at least one metal chelate complex epoxy-cure catalyst,
   and wherein said at least one polymer of component A is selected from the group consisting of an addition polymer derived from one or more olefinically unsaturated monomers by a free-radical polymerisation process and a polyurethane polymer, and wherein the epoxy-reactive groups of said at least one polymer of component A are at least in part carboxyl groups.

2. Composition according to claim 1 wherein the epoxy-reactive groups of said at least one polymer of component A also include one or more of amine and hydroxyl groups.

3. Composition according to claim 1 wherein said at least one polymer of component A is in the form of an aqueous latex in the composition.

4. Composition according to claim 1 wherein said at least one polyepoxide compound of component B is a polyepoxide resin.

5. Composition according to claim 3 wherein said at least one polyepoxide compound of component B is an addition polymer bearing epoxide groups derived from one or more olefinically unsaturated monomers by a free-radical polymerisation process.

6. Composition according to claim 1 wherein said at least one metal chelate complex of component C is a chelate complex of a metal and a ligand-providing organic compound comprising at least two electron-donating atoms in a 1,5 electron donatable spacial arrangement.

7. Composition according to claim 6 wherein said at least one metal chelate is a metal 1,3-dicarbonyl compound.

8. Composition according to claim 7 wherein said at least one metal chelate complex is selected from metal acetylacetonates and metal acetoacetate esters.

9. Composition according to claim 5 wherein said at least one metal chelate complex of component C is a chelate complex of a metal and a ligand-providing organic compound comprising at least two electron-donating atoms in a 1,4 electron donatable spacial arrangement.

10. Composition according to claim 9 wherein said at least one metal chelate complex is selected from metal ethanolamines, metal diethanolamines and metal triethanolamines.

11. Composition according to claim 1 wherein said at least one metal chelate complex is in the form of a compound in which the metal is covalently bonded to one or more organic groups as well as being coordinated to one or more donor ligands.

12. Composition according to claim 11 wherein said at least one metal chelate complex is a half chelate/alkoxide.

13. Composition according to claim 12 in which the donor ligand(s) of the chelate is selected from a 1,3-dicarbonyl compound, preferably acetylacetone, and ethanolamine, diethanolamine and triethanolamine.

14. Composition according to claim 1 wherein said at least one metal chelate complex of component C is a mixture of two or more different metal chelate complexes.

15. Composition according to claim 1 wherein the metal(s) of said at least one metal chelate complex of component C is selected from Al, Ti, Fe, Co, Ba, Zr, K and Zn.

16. Composition according to claim 15 wherein said metal(s) is selected from Al and Ti.

17. Composition according to claim 1 wherein said at least one metal chelate complex of component C is selected from one or more of the following Al (acetylacetonate)$_3$
Ti (acetylacetonate)$_2$
Ti bis (triethanolamine)
bis (triethanolamine) Ti di-isopropoxide
(acetylacetonate)$_2$ Ti di-isopropoxide
Al (ethyl acetoacetate)$_3$ 18. Composition according to claim 1 wherein the levels of components A, B and C are within the following ranges, based on the total weight on a dry basis of components A, B, and C in the composition A : 70 to 99.8 weight %
B : 0.1 to 20 weight %
C : 0.1 to 15 weight %

19. Composition according to claim 1 wherein said composition includes at least one free (i.e. uncomplexed) ligand-providing organic compounds of a type which forms a metal chelate epoxy-cure catalyst with a metal.

20. A crosslinked coating derived from a composition according to claim 1.

21. A storage stable one-pack aqueous-based crosslinkable coating composition comprising an aqueous dispersion of at least the following components:

A: at least one polymer having epoxy-reactive functional groups,
B: at least one polyepoxide compound, and
C: at least one metal chelate epoxy-cure catalyst, and wherein said at least one polymer of component A is selected from the group consisting of an addition polymer derived from one or more olefinically unsaturated monomers by a free-radical polymerisation process and a polyurethane polymer, and wherein the epoxy-reactive groups of said at least one polymer of component A are at least in part carboxyl groups.

* * * * *